(12) United States Patent
Olafsson et al.

(10) Patent No.: US 6,928,107 B1
(45) Date of Patent: Aug. 9, 2005

(54) ITERATIVE PRECODING SYSTEM AND METHOD FOR RESOURCE LIMITED DATA TRANSCEIVERS

(75) Inventors: Sverrir Olafsson, Reykjavik (IS); Ragnar Hlynur Jonsson, Reykjavik (IS)

(73) Assignee: Mindspeed Technologies, Inc., Newport Beach, CA (US)

( * ) Notice: Subject to any disclaimer, the term of this patent is extended or adjusted under 35 U.S.C. 154(b) by 853 days.

(21) Appl. No.: 09/675,552

(22) Filed: Sep. 27, 2000

Related U.S. Application Data

(60) Provisional application No. 60/156,175, filed on Sep. 27, 1999.

(51) Int. Cl.[7] .................................................. H04B 1/38
(52) U.S. Cl. ........................ 375/219; 375/222; 375/233; 375/285; 370/286
(58) Field of Search ................................ 375/219–222, 375/229, 231–233, 242, 259, 296, 340; 370/286; 360/65

(56) References Cited

U.S. PATENT DOCUMENTS

| | | | | |
|---|---|---|---|---|
| 5,559,561 A | * | 9/1996 | Wei ............................ | 348/470 |
| 5,881,108 A | * | 3/1999 | Herzberg et al. ............ | 375/296 |
| 6,072,782 A | * | 6/2000 | Wu .............................. | 370/286 |
| 6,167,082 A | * | 12/2000 | Ling et al. ................... | 375/233 |
| 6,219,378 B1 | * | 4/2001 | Wu .............................. | 375/231 |
| 6,233,276 B1 | * | 5/2001 | Simeon ........................ | 375/232 |
| 6,594,306 B1 | * | 7/2003 | Mehrabanzad et al. ...... | 375/222 |

OTHER PUBLICATIONS

Gerald Hoefer, Duplex low–speed PCM for on–hook data transmission, Sep. 13–16, 1999, Leuven, Belgium, 2 pages.
Gerald Hoefer, Increasing V.90 data rates up to 64 kb/s by using equidistant constellation points through Linear Coding, Sep. 13–16, 1999, Leuven, Belgium, 3 pages.
Gerald Hoefer, Pulse Amplitude Modulation for Voiceband Codecs supporting Linear Coding, Oct. 13, 1999, Columbia, Maryland, 4 pages.
Gerald Hoefer, Negotiation of Parameters for Linear PAM Coding, Oct. 13, 1999, Columbia, Maryland, 5 pages.
Gerald Hoefer, Proposal to include PCM optimized codec quantization into V.92, Jan. 12, 2000,, Boca Raton, Florida, 3 pages.

\* cited by examiner

*Primary Examiner*—Young T. Tse
*Assistant Examiner*—Edith Chang
(74) *Attorney, Agent, or Firm*—Farjami & Farjami LLP

(57) ABSTRACT

A system and method for training an equalizer structure of a digital data communication system in order to compensate for transmission impairments on the line particularly wherein one transceiver of the two is resource limited. In an exemplary embodiment, a line card provides equalization feedback to a modem whenever changes to the equalization are beneficial. The line card calculates a limited number of tap correction factors at one time, transfers the tap correction factors to the modem, and then trains up a new set of tap correction factors. The modem incorporates the tap correction factors into the taps of the corresponding frequency ranges. The process iterates indefinitely through the transmission resulting in a very high quality equalization.

29 Claims, 10 Drawing Sheets

ITERATIVE PRECODING SYSTEM AND METHOD FOR RESOURCE LIMITED DATA TRANSCEIVERS

INCORPORATION BY REFERENCE

This application claims the benefit of Provisional Application No. 60/156,175, filed Sep. 27, 1999

The following commonly-assigned patent applications are hereby incorporated by reference in their entirety, including drawings and appendices, and are hereby made part of this application for all purposes:

U.S. application Ser. No. 09/395,726, filed Sep. 10, 1999, entitled "Upstream PCM Transmission for a Modem System", now the U.S. Pat. No. 6,414,989.

U.S. application Ser. No. 09/656,804, field Sep. 9, 2000, entitled "System And Method For Selecting A Transmission for a Mode", now the U.S. Pat. No. 6,744,819.

BACKGROUND OF THE INVENTION

1. Field of the Invention

The present invention relates to digital data communication systems and methods. Specifically, the present invention relates to the equalization of digital data communication signals in order to compensate for transmission impairments on the line. Even more specifically, the present invention relates to the equalization of digital data communication signals wherein one transceiver of the two is resource limited. In a specific application, this invention relates to load sharing between the digital signal processor of a customer premises modem and the digital signal processor of a central office line card by use of a Tomlinson-Harashima precoder.

2. Description of the Related Art

Since shortly after the invention of the digital electronic computer, it has been necessary to transfer data from one computer to another. Early methods, such as punch cards, were quite slow and primitive by today's standards, and it has long been apparent that it would be advantageous to be able to transmit data more quickly and efficiently. Although computer data is, generally speaking, digital, methods were quickly developed to transmit such data through infrastructure that was designed to transmit analog data. Such analog infrastructure included telephone lines (via modems), radio transmissions, and the like. The ability to transfer digital data has improved tremendously over the last few decades. In fact, digital data communications have in many ways surpassed analog data communications, and data that has traditionally been transmitted through analog communications is now being transmitted digitally, for instance, mobile phones and digital television. Despite the tremendous advances in digital data communications, the potential benefit of further advances has become even more apparent. Demand to transmit data through digital data communications has kept up with the extraordinary advances in digital data communications. Such increases in demand are largely attributable to increased use of the Internet and of mobile phones. Thus, a tremendous need exists for faster and more accurate digital data communications.

Digital data is typically transmitted as a series of symbols. The speed of digital data communication can be increased by either reducing the amount of time provided for each symbol, or increasing the amount of data (bits) contained in each symbol. Which symbol is being transmitted is typically indicated by varying the amplitude, phase angle, frequency or some combination thereof, of the signal. However, as the time provided for each symbol decreases, and the number of different symbols that may be transmitted increases, it becomes more and more difficult to distinguish one symbol from another. The characteristics of the transmission line, or other medium, typically effect the signal. For instance, some frequencies may be attenuated more than others, and some frequencies may travel faster through the transmission line than others. These transmission medium characteristics that effect the signal are called channel distortions, and are a major factor in limiting the speed at which digital data can be communicated. However, it is possible to compensate for channel distortions to some degree by selectively filtering or amplifying different frequency ranges. Such selective compensation of frequency ranges is called equalization, and is effective at increasing the rate at which digital data can be transmitted.

Digital communication systems may employ a number of initialization, training, and adaptive learning protocols that are designed to equalize the channel distortions, optimize the data transmission speed, reduce transmission errors, and improve the quality of the received signal. Precoding has been used to provide near-optimal equalization in a number of applications, such as in V.34 modems and HDSL2 transceivers. Generally the precoding is applied in a symmetric fashion, where both receivers in a communication link generate precoding filters during a startup sequence, and transfer the results to the remote transmitter for insertion in a precoder arrangement. In some cases a linear pre-equalizer or pre-emphasis filter is transferred as well to effectively perform all of the channel equalization in the transmitter.

The current generation of pulse code modulation (PCM) modems, i.e., modem systems compliant with ITU-T Recommendation V.90, perform an initial training procedure to adaptively adjust the equalizer structure resident at the client-side analog modem (APCM). In addition, an echo cancellor architecture resident at the server-side digital modem (DPCM) may be adaptively trained during an initialization period such that the echo channel associated with the DPCM is adequately emulated. V.90 modem systems perform an initial two-point training procedure in the downstream direction during which one constellation signal point (based on a particular $\mu$-law or A-law level) is transmitted as a sequence having positive and negative signs. The DPCM transmits the two-point training sequence to the APCM, and the APCM analyzes the received signal to determine the channel characteristics and to adjust its equalizers. In the upstream direction, a 4 or 16 point QAM modulated signal sequence is transmitted to the DPCM receiver, which generates a precoder filter based on the received sequence and transmits the precoder taps to the APCM, which in turn inserts that precoder filter into its precoder. Digital Data Communication in general, and Equalization in particular, is discussed in Lee & Messerschmitt, DIGITAL, COMMUNICATION, (2d ed. 1996), the contents of which are incorporated herein by reference.

3. Overview of the Invention

An equalization arrangement using precoding can be taken advantage of in situations where resources are limited in one of the two transceivers, or indeed, where resources are limited for most receivers in a multi-point communication system. Relieving the receiver of the equalization task generally reduces its processing load considerably. However, the effort of generating the precoder and possibly pre-equalizer filters still remains. In the following, systems and methods are shown where calculation of these filters can be performed even under strict resource limitations, enabling high-performance equalization with minimal processing load on one end of the connection One significant application of this method is in communicating with central-office line cards. The increasing of data transmission rates beyond rates offered by V.90 is possible by making the line card an active participant in the data connection from an analog-connected modem to a digitally connected central site. This could be done using V.90 symbol rates and encoding methods, or by redesigning the modulation methods and possibly extending the symbol rates beyond V.90. Line-cards could also provide a constant low-rate on-hook channel to achieve an "always-on" connection. Present here is a modulation and equalization method that preferably can accommodate all these scenarios in a comprehensive fashion, preferably obtaining near-optimal performance given the resource restraints in the line card. The modulation in the opposite direction from the line-card to the modem is not a concern. That direction may employ conventional preceding techniques or indeed, in the interest of saving line-card resources, not use preceding at all. It will be expected that a communication link does exist.

This invention presents systems and methods of modulation and equalization for scenarios where one of two transceivers is resource limited. An exemplary precoding method itself is a form of Tomlinson preceding combined preferably with pre-equalization that is primarily phase equalization. Several systems and methods of obtaining precoder and pre-equalizer taps are presented, one based on channel-estimation techniques, and another based on shortened equalization. The former method allows greater flexibility in meeting resource requirements, but may become unnecessarily cumbersome overall for low-rate applications. The latter method allows a simple and effective equalization scheme for low data rates, but may require more effort in obtaining more optimal equalization at higher rates. Different configurations may favor one or the other, indeed some applications may combine the two in some form.

SUMMARY OF THE INVENTION

In partial fulfillment of the above-mentioned needs, this invention provides a digital data communications system with a first transceiver with an equalizer and a plurality of taps. This system also has a second transceiver, a local loop connecting the first transceiver to the second transceiver, and a feedback means for the second transceiver to calculate tap correction factors for the taps, for part of the taps at a time, repeatedly during the transmission of the digital data, and transfer the tap correction factors to the first transceiver. This invention also provides a digital data communications system with a transmitter configured to receive a digital signal, convert the digital signal to a voice-band analog signal, and transmit the voice-band analog signal via a communication medium to a receiver. In this system the transmitter also has an equalizer with a plurality of taps, which is configured to equalize the voice-band analog signal. The transmitter is also configured to receive from the receiver tap correction factors for a portion of the taps at a time. It does so repeatedly during transmission of the voice-band analog signal and incorporates the tap correction factors into the taps. This invention further provides a preceding system for resource-limited transceivers. This system has a transmitter with a preceding filter, a channel, a feedback loop involving a modulo operation and providing filter taps, and a receiver with a slicer.

This invention additionally provides several methods of generating precoder taps with a resource-limited transceiver. One method includes the steps of constructing an estimate of the channel response, and calculating the equalizer taps from the estimate, the less-limited transceiver typically performing the equalizer calculation. Another method includes the steps of calculating, with the resource-limited transceiver, a first set of equalizer taps for a shortened equalizer, and transferring the first set of equalizer taps to the less-limited transceiver. This method also includes the steps of the less-limited transceiver installing the equalizer taps in its precoder section, and, with the resource-limited transceiver, calculating a second set of equalizer taps for the shortened equalizer. It further includes the steps of transferring the second set of equalizer taps to the less-limited transceiver, the less-limited transceiver then installing the equalizer taps in its precoder section. These steps are then repeated.

Furthermore, this invention also provides a system for asymmetric processor load sharing between a customer premises modem and a central office line card. This system has a customer premises modem with a Tomlinson-Harashima precoder with a plurality of precoder taps, a channel with linear filter characteristics and additive noise, and a line card with a DSP located at a central office. In this system the line card is programmed to act as a modem and help select the precoder taps. This invention still further provides several methods for asymmetric processor load sharing between a customer premises modem and a central office line card. One such method includes the steps of training first taps for a first equalizer in the line card, and sending the first taps to the customer premises modem. The customer premises modem has a second equalizer with second taps, and other steps in the method include incorporating the first taps into the second taps of the second equalizer, and repeating these steps through multiple iterations. Another method includes the steps of: transmitting a known pseudo-random sequence from the customer premises modem to the line card, finding the correlation between the transmitted signal and the received signal for a specific delay, updating part of the channel taps, and repeating these steps through multiple iterations.

This invention even further provides a system for asymmetric processor load sharing between a plurality of customer premises modems and a central office line card. This system has a line card located at a central office programmed to act as a modem and receive signals from customer premises modems. In this system, the customer premises modems have equalizers and are programmed to equalize the signals. In this system, the equalizers have taps, and the line card is programmed to help select the taps.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and:

DETAILED DESCRIPTION OF THE DRAWINGS

Figure 1:
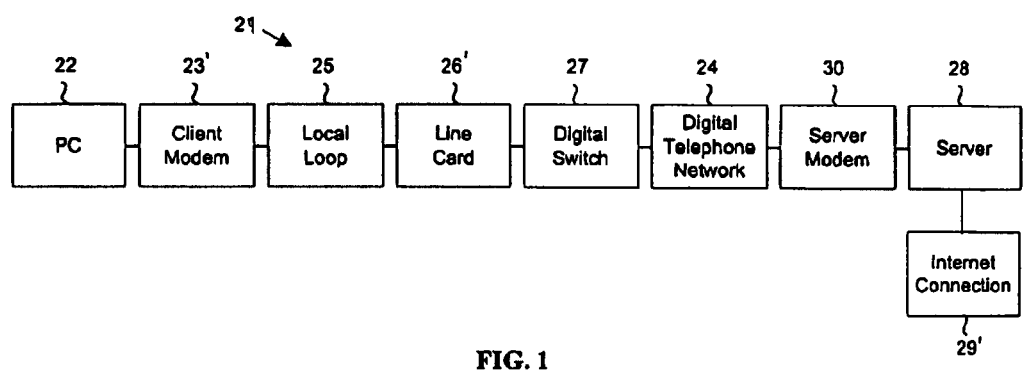
FIG. 1 illustrates a conventional prior art digital data communication system whereby a personal computer is connected via a local loop to an Internet server.

FIG. 1 illustrates an exemplary conventional prior art digital data communication system 21. Conventionally, client modem 23'at personal computer 22, connects through local loop 25 to line card 26' at a central office, which in turn typically connects to digital switch 27. Note that herein, the prime (e.g. 23') indicates a prior art component that is similar, but not necessarily identical to, a corresponding component (of the same number except without the prime) of the present invention. Digital switch 27 is usually connected to the digital switched telephone network 24, which typically connects to the server modem (DPCM) 30. Server modem 30 generally connects to server 28, which in turn typically connects to Internet connection 29. Personal computer 22 and client modem 23'are typically located at the customer premises, and are in this example connected via a local loop 25, typically comprising a twisted wire pair, to line card 26' and digital switch 27, which are typically located at a central office. Line card 26' is typically designed to quantize analog audio transmissions before routing them through digital switch 27. The quantization is conventionally performed according to the μ-law or A-law quantization rule. This method of analog to digital (A/D) conversion is sub-optimal for digital transmissions in general. Also, in many cases, digital switches (i.e. digital switch 27) have a strenuous workload and telephone companies have an interest in relieving that strain. For those reasons it would be beneficial to find an alternative way to connect line card 26' to digital networks such as the Internet.

Still referring to FIG. 1, in many cases, line card 26' comprises a digital signal processor and could be programmed to act as a simple modem. Such functionality is limited, inter alia, by the processing power (the number of instructions executed per time unit) of line card 26'. A significant part of the signal processing done by a modem has to do with equalizing the channel, i.e. remedying the signal distortion due to intersymbol interference (ISI) and noise. Usually, the receiver has access to a training sequence that is transmitted through the channel, and by comparing the two sequences, in some way or another, and applying signal processing techniques, the receiver is able to recover the transmitted data with a minimal error rate. In the case of line card 26', doubling as a modem, the processing power is limited. However, client modem 23'is usually not as limited. If it were possible for the customer premises modem (line card 26') to perform the equalization, canceling out the channel distortion before it takes place, it would become practical to use line card 26' (with its limited processing power) as a modem, thereby making it possible to bypass digital switch 27 and connect to the Internet (e.g. server 28) or other digital networks directly.

Such equalization is in fact possible, as described below, as an example, through the use of a precoder. The Tomlinson-Harashima precoder (THP) is widely used and understood by those skilled in the art, so without precluding the possibility of using other kinds of precoders, the precoder will henceforth be referred to as a THP. In effect, the THP involves moving the (non-linear) feedback part of the equalizer from line card 26' to client modem 23' without incurring the loss in efficiency if the feedback equalizer were implemented as a simple transmit filter. This is often done to avoid the error propagation associated with DFEs, but it can also be used for achieving asymmetric processor load. A problem that will be addressed below is how to select the taps for the THP.

Figure 2:
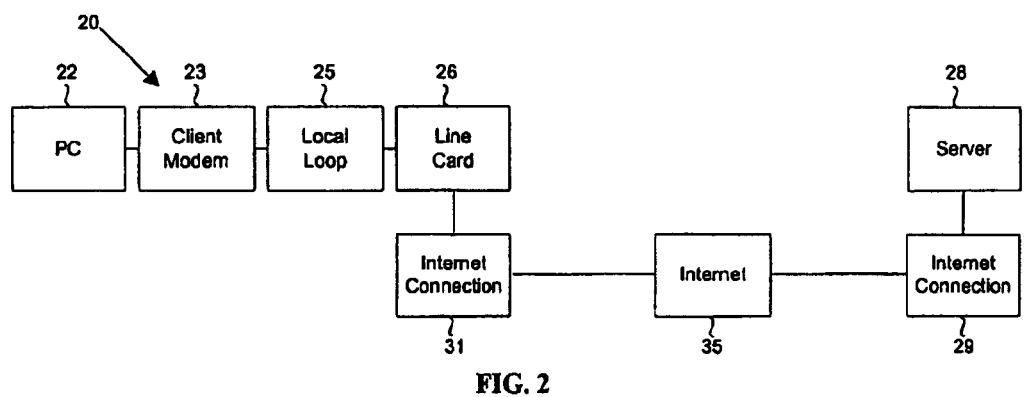
FIG. 2 illustrates an exemplary application of the present invention digital data communication system whereby a personal computer is connected via a local loop and a line card to an Internet server.
Figure 3:
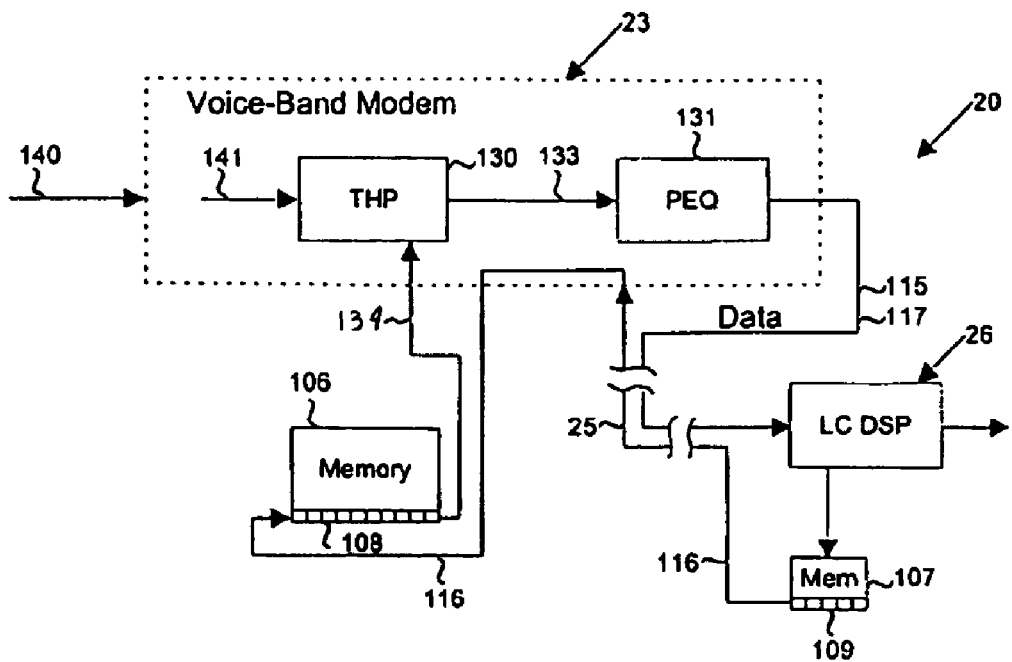
FIG. 3 is a block diagram illustrating the major components of an exemplary embodiment of the present invention including a voice-band client modem and a line card DSP.

FIGS. 2 and 3 illustrate general exemplary embodiments of the present invention. FIG. 2 illustrates as an example, one typical application of the present invention, digital data communication system 20 whereby a personal computer 22 is connected via client modem 23 to a local loop 25. As used herein, a modem (e.g. client modem 23) is preferably a device that adapts a terminal or computer (e.g. personal computer 22) to an analog telephone line (i.e. local loop 25) by converting digital pulses to audio frequencies and preferably vice versa. The term "modem" may refer, inter alia, to FFE 56 Kbps modems (V.90), the current top speed, or to older 28.8 Kbps modems (V.34). Client modem 23 is shown external to personal computer 22 for illustrative purposes, but in most cases client modem 23 would be located within personal computer 22. Client modem 23 is a transceiver which converts digital signals from personal computer 22 to analog signals, and transmits the analog signals along local loop 25. Client modem 23 preferably also converts analog signals from local loop 25 to digital signals which it passes on to personal computer 22. Local loop 25 typically is comprised of a twisted wire pair. On the other end of local loop 25 is line card 26, which, in the exemplary embodiment depicted in FIG. 2, is connected through Internet connection 31, the Internet 35, and Internet connection 29 to Internet server 28. Internet server 28 is typically operated by an Internet service provider (ISP). Internet server 28 typically connects to other Internet connections which connect to other Internet servers all over the world collectively forming the World Wide Web (WWW) or Internet 35.

FIG. 3 is a block diagram schematically illustrating components of an exemplary embodiment of the present invention. Digital data communications system 20 preferably consists of a transmitter, preferably client modem 23, and a receiver, preferably line card 26. Both client modem 23 and line card 26 are preferably transceivers. In an exemplary embodiment, client modem 23 is a voice-band modem. As used herein, a voice-band modem is a modem (as described above) that operates in the frequency range used to transmit and receive human voice (e.g. telephone) communications. Client modem 23 is preferably a transmitter with an equalizer (e.g. pre-equalizer 131). Line card 26 preferably works in conjunction with, or comprises, a DSP. Line card 26 is described herein in an exemplary way as a single-channel card with a single DSP dedicated for line card 26. However, in some implementations, a single DSP is shared among a few line cards 26. In other implementations, a single line card supports multiple channels. In still other implementations, multiple DSPs may be available to the same line card 26. As used herein, a DSP is a Digital Signal Processor, which is preferably a special-purpose CPU used for digital signal processing. It preferably provides efficient signal processing instruction sequences such as multiply and accumulate, which are commonly used in math-intensive signal processing applications. DSP chips are widely used in a myriad of devices, including sound cards, fax machines, modems, cellular phones, high-capacity hard disks and digital TVs. A line card is a printed circuit board that preferably provides a transmitting/receiving port for a particular protocol. Line cards (e.g. line card 26) preferably plug into a telco (telephone company) switch, network switch, router or other communications device (herein a digital switch, e.g. digital switch 27 in FIG. 1). Line cards preferably are used with a modular chassis that supports multiple transmission ports.

In the exemplary embodiment illustrated in FIG. 3, client modem 23 is in communication with line card 26 for the purpose of sending data stream 117 from client modem 23 to line card 26. In furtherance thereof, line card 26 is equipped to provide feedback 116 to client modem 23. As often is the case in such situations, client modem 23 typically has many resources at its disposal, including, inter alia, a large memory 106. However, line card 26 is typically resource limited, having, inter alia, only small memory 107 at its disposal. Line card 26 typically also lacks significant processing capabilities. Client modem 23 equalizes the signal carrying data stream 117 preferably as described herein. To do this, client modem 23 stores taps 108 in large memory 106, preferably for the entire frequency range being used. Line card 26 preferably stores equalizer tap correction factors 109 for part of the frequency range (of taps 108) in small memory 107.

Still referring to FIG. 3, line card 26 analyzes data stream 117 and in one embodiment calculates tap correction factors 109. In other words, the receiver (preferably line card 26) is configured to calculate a limited number of tap correction factors 109 at a time and transfer this limited number of tap correction factors 109 to the transmitter (preferably client modem 23). If tap correction factors 109 have changed significantly (enough to warrant changing the equalizer taps), then line card 26 preferably sends tap correction factors 109 to client modem 23 via feedback 116. Client modem 23 then preferably incorporates tap correction factors 109 into the appropriate equalizer taps 108. In one of the exemplary embodiments, tap correction factors 109 are incorporated by combining tap correction factors 109 with previous taps 108. Line card 26 would then preferably begin analyzing data stream 117 to calculate a new set of tap correction factors 109. Line card 26 preferably continues to calculate tap correction factors 109, send the tap correction factors 109 to client modem 23 when tap correction factors 109 have changed, and calculate another set of tap correction factors 109. This process is preferably repeated until the transmission of data stream 117 is complete. In other words, this process herein described for digital data communications system 20, using feedback 116, constitutes a means (called herein a feedback means) for a transceiver (preferably line card 26) to calculate tap correction factors 109 for taps 108, for part of taps 108 at a time, repeatedly during the transmission of the digital data (data stream 117), and transfer the tap correction factors 109 to another transceiver (e.g. client modem 23). Because only part of taps 108 are adjusted at a time, far greater equalizer sizes (number of taps 108) are possible than what line card 26 could implement at once. Consequently, the quality of equalization is far greater, and the communications session can begin at a low data rate, and then increase the data rate as the equalization improves.

Still referring to FIG. 3, client modem 23 is preferably a transmitter configured to receive a digital signal (digital input data 140), convert the digital signal (digital input data 140) to a voice-band analog signal (signal 115), and transmit the voice-band analog signal (signal 115) via a communication medium (e.g. local loop 25) to a receiver (e.g. line card 26). Client modem 23 preferably comprises an equalizer (e.g. pre-equalizer 131) having a plurality of taps 108 wherein the equalizer is configured to equalize the voice-band analog signal 141. In one exemplary embodiment, client modem 23 comprises both a feedforward equalizer (FFE) and a decision feedback equalizer (DFE), and taps 108 comprise feedforward taps and feedback taps. Tap correction factors 109 preferably comprise feedforward tap correction factors and feedback tap correction factors. Client modem 23 is in communication with line card 26 for the purpose of sending data stream 117 contained in signal 115 from client modem 23 to line card 26. Line card 26 is equipped to provide feedback 116 to client modem 23.

As shown in FIG. 3, client modem 23 equalizes the signal 115. To do this, client modem 23 preferably receives digital input data 140 and converts it to the desired protocol for transmission, creating analog signal 141. Client modem 23 then feeds signal 141 into Tomlinson precoder 130. Tomlinson precoders are well known to people skilled in the art and are described in Lee & Messerschmitt, DIGITAL, COMMUNICATION, (2d ed. 1996), (see particularly p. 460) the contents of which are incorporated herein by reference. Taps 108 are preferably incorporated into Tomlinson precoder 130 via connection 134. Tomlinson precoder 130 then outputs signal 133 which preferably goes through near-flat pre-equalizer 131 before leaving client modem 23. In other words, near-flat pre-equalizer 131 preferably follows Tomlinson precoder 130. Signal 115 is output from client modem 23, and preferably travels via local loop 25 to line card 26. In FIG. 3, line card 26 analyzes signal 115 and calculates tap correction factors 109. If tap correction factors 109 have changed, then line card 26 preferably sends tap correction factors 109 to client modem 23 via feedback 116. Thus, in one embodiment, line card 26 is preferably configured to calculate a limited number of tap correction factors 109 at a time and transfer this limited number of tap correction factors 109 to client modem 23. In addition, in an exemplary embodiment of the present invention, client modem 23 is configured to receive, preferably from line card 26, tap correction factors 109, for a portion or all of the taps 108 at a time, preferably repeatedly during transmission of the voice-band analog signal 115, and incorporate tap correction factors 109 in taps 108.

Referring still to FIG. 3, in an exemplary embodiment, tap correction factors 109 are set to zero if there is no update needed (no change in equalization is indicated). To determine tap correction factors 109 have changed sufficiently to warrant sending them to client modem 23, line card 26 preferably squares the value of each tap correction factor 109, and then adds these squares together. If the sum exceeds a threshold value, then line card 26 preferably sends tap correction factors 109 to client modem 23 via feedback 116. Feedback 116 travels through local loop 25 to client modem 23. Client modem 23 then incorporates tap correction factors 109 into the appropriate taps 108 in memory 106. This process herein described for digital data communications system 20, using feedback 116, constitutes a means (called herein a feedback means) for a transceiver (preferably line card 26) to calculate tap correction factors 109 for taps 108, for part of taps 108 at a time, repeatedly during the transmission of the digital data (data stream 117 contained in signal 115), and transfer the tap correction factors 109 to another transceiver (preferably to client modem 23).

Referring generally to FIGS. 2–3, combining this invention with hardware changes could potentially provide further advantages. However, some embodiments of the present invention may be accomplished without any new hardware or hardware modifications. Rather, these embodiments are essentially accomplished through software changes to the transmitter and the receiver (preferably client modem 23 and line card 26 as described above). Such software changes could easily be written by a programmer skilled in the art, without undue experimentation. Software changes to client modem 23 could be distributed via the Internet. Such distribution would encourage the widespread adoption of this invention and increase consumer expectations for the superior performance associated with its use.

FIGS. 5–13 illustrate in detail various exemplary embodiments of the present invention, and are referred to in the description below. The present invention provides, inter alia, systems and methods for asymmetric processor load sharing between a customer premises modem and a central office line card. Conceptually, line card 26 is typically a system with two functional units. First there is typically a $\mu$-law converter, and then there is typically a slicer. The $\mu$-law preferably reflects properties of human auditory perception and is appropriate when high amplitude pulses are less likely than low amplitude pulses, as is the case with voice-band transmission. It typically employs a fine quantization near zero and a coarse quantization at higher amplitudes. In most practical applications, the line card consists of an A/D converter and a digital signal processor (DSP) that implements the $\mu$-law. A line card implemented with a DSP can typically be programmed to distinguish a call made by a regular telephone from a call made by a modem. Thus, it can typically be made to function as a regular line card, performing $\mu$-law quantization, when contacted by a telephone, and function as a simple modem when contacted by a modem. The ability of the line card to function as a modem is often restricted by its limited processing power. This restriction is preferably mitigated through the use of a Tomlinson-Harashima precoder (THP). The customer premises modem usually contains a powerful DSP, which can relatively easily handle the load due to the precoder. Hence the term "asymmetric load sharing line card".

Figure 4:
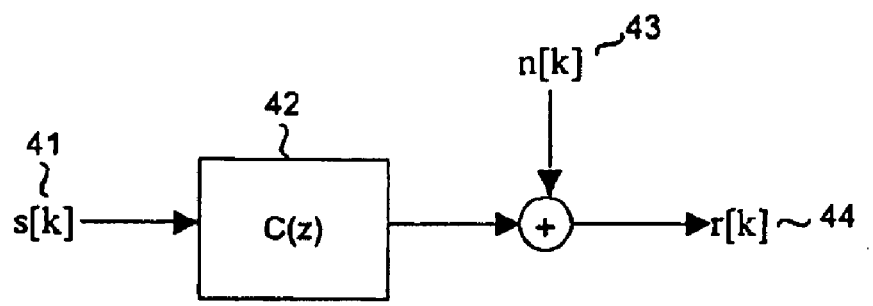
FIG. 4 illustrates a general model of a linear channel with additive noise.

A general model of a linear channel with additive noise is described by FIG. 4. s[k] is the transmitted discrete signal 41, C(z) is a linear filter 42 described by $$C(z) = \sum_{l=0}^{N-1} c[l] z^{-l} \quad (1)$$

n[k] is noise 43, possibly colored, not necessarily gaussian, and r[k] is the received discrete signal 44, related to s[k] (transmitted discrete signal 41) by $$r[k] = \sum_{l=0}^{N-1} c[l] s[k-l] + n[k] \quad (2)$$

C(z) (linear filter 42) represents the distortion of s[k] (transmitted discrete signal 41) due to inter-symbol interference (ISI). Note, that C(z) (linear filter 42) is a discrete approximation of an analog channel, substituted here for simplicity. As a major factor in recovering the transmitted signal, r[k] (received discrete signal 44) is usually put through some sort of equalizer. The optimal zero-force equalizer is simply $C^{-1}$ (z). However, due to the addition of n[k] (noise 43), the error rate is not minimized in this case. In order to minimize the probability of error, some sort of trade-off between minimizing ISI and minimizing noise 43 has to take place. This is often achieved by using the Least Mean Square criterion (LMS), the use of which is demonstrated in FIG. 5.

Figure 5:
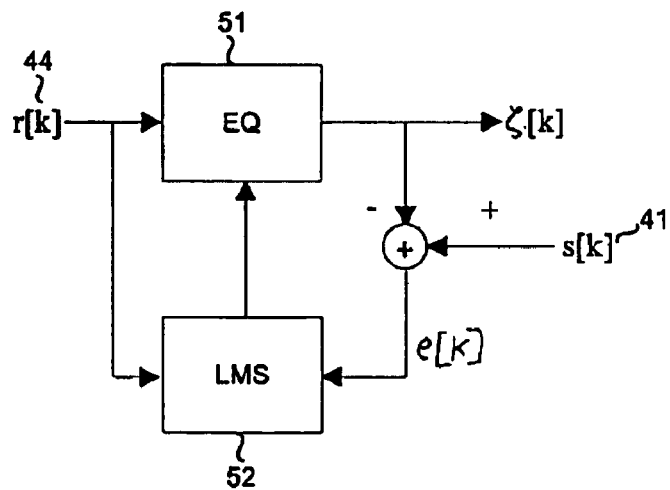
FIG. 5 illustrates an equalizer whose taps are updated by the Least Mean Square (LMS) algorithm.

FIG. 5 illustrates an equalizer whose taps are updated by the Least Mean Square (LMS) algorithm. EQ is the channel equalizer 51, which could be a linear (feed-forward) equalizer (LE or FFE) or a decision feedback equalizer (DFE). Channel equalizer 51's taps are updated by use of the LMS algorithm 52, which strives to minimize the mean square error $E[e^2[k]]$. Let us now focus on the DFE (embodiment of channel equalizer 51) and describe the system more fully with reference to FIG. 6.

Figure 6:
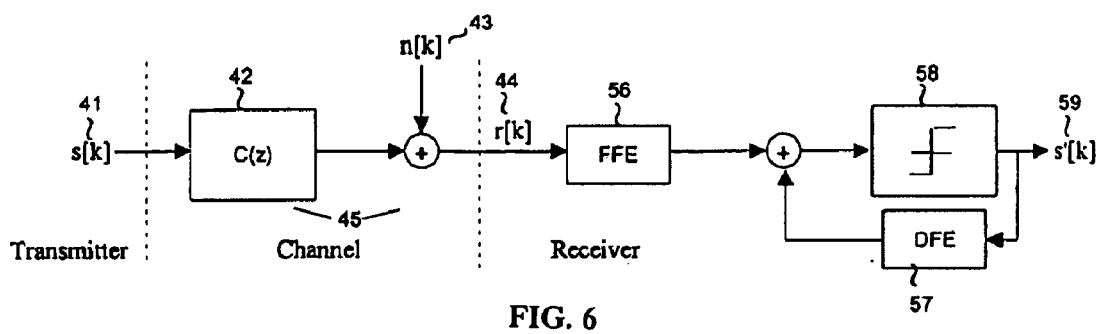
FIG. 6 illustrates a channel and a decision feedback equalizer (DEE)
Figure 7:
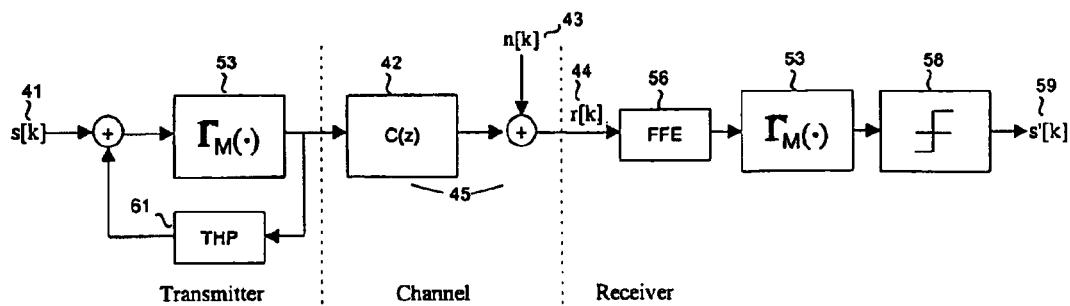
FIG. 7 illustrates an exemplary Tomlinson-Harashima precoder, channel and feedforward equalizer (FFE)

FIG. 6 illustrates a channel 45 and a decision feedback equalizer (DFE) 57. With the system setup in FIG. 6, it is apparent that the receiver has to determine the taps for both the FFE 56 and the DFE 57 units and also calculate s'[k] 59 based on those taps. This may require excessive computational and storage resources for the DSP of line card 26 (shown in FIG. 2) to do. In many applications, DFE 57 is moved to the transmitter side, with the addition of a modulo operator 53, becoming a Tomlinson-Harashima precoder 61, as shown in FIG. 7. The modulo operator 53 in the precoder is defined on an M-ary input constellation with uniform spacing d such that $$\Gamma_M(x) = x - M \cdot d \cdot \left\lfloor \frac{x + \frac{M \cdot d}{2}}{M \cdot d} \right\rfloor \quad (3)$$

The output of the operator is confined to the interval

The output of the operator is confined to the interval $\left[ -\frac{M \cdot d}{2}, \frac{M \cdot d}{2} \right)$.

It is possible to move the feedforward equalizer 56 also to the transmitter (to client modem 23 shown in FIG. 2), thus relieving the receiver (line card 26 shown in FIG. 2) of any equalizing. However, as described herein, in an exemplary embodiment, the line card is programmed to help select the precoder taps. The feedforward unit (FFE 56) will be referred to as a (prefilter 62 in FIG. 11). In an exemplary embodiment, prefilter 62 is a feedforward precoder (FFP). It should be noted, that positioning the feedforward unit (FFE 56) between modulo operator 53 and channel 45 means the transmitted signal is no longer confined to the interval of modulo operator 53. One function of the feedforward equalizer is to whiten the noise, to alleviate its impact on the signal. If no feedforward filter is located at the line card modem (LCM) (e.g. line card 26 shown in FIG. 2), the signal is susceptible to the ill effect of colored noise. For those reasons, although it will henceforth be assumed, for simplicity, that the feedforward filter is wholly on the transmitter side, practical implementation may in some cases split the feedforward filter into two parts, i.e. part of the feedforward filtering occurring in the transmitter and part of it occurring in the receiver.

Figure 8:
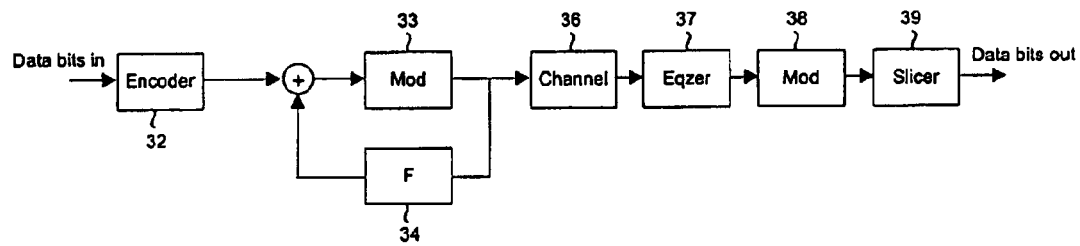
FIG. 8 also shows an exemplary Tomlinson-Harashima preceding arrangement.

FIG. 8 also illustrates a typical Tomlinson-Harashima precoding arrangement. In this configuration, the receiver (e.g. line card 26 shown in FIG. 2 and described above with reference thereto) determines a preceding filter 34 during a startup procedure (where preceding is disabled), and sends the filter 34 taps to the transmitter (e.g. client modem 23 shown in FIG. 2). The transmitter implements the filter 34 in a feedback loop involving a modulo operation (Mod) 33 that depends on the signal constellation. Effectively, modulo operation 33 causes the spectrum to be white, thus avoiding any loss of efficiency that would result if it were a pure feedback filter. The receiver then recovers the data sequence transmitted by performing the same modulo operation 33 either before or after slicing (with slicer 39), or performing some form of extended slicing.

Several strategies can be used to determine the taps for filter 34. Usually they can be characterized as being DFE-based or Noise-Predictor based. In the former strategy (herein referred to as being DFE-based) the receiver trains up a Decision Feedback Equalizer 37 with a feedforward and feedback section, and the feedback section constitutes the precoding filter 34. In the latter case (herein referred to as being noise-predictor based) the receiver trains up a Noise-Predictor along with equalizer 37 and the noise-predictor taps represent the precoding filter 34. In that case, equalizer 37 will need to incorporate the noise-predictor taps once preceding is enabled.

Figure 9:
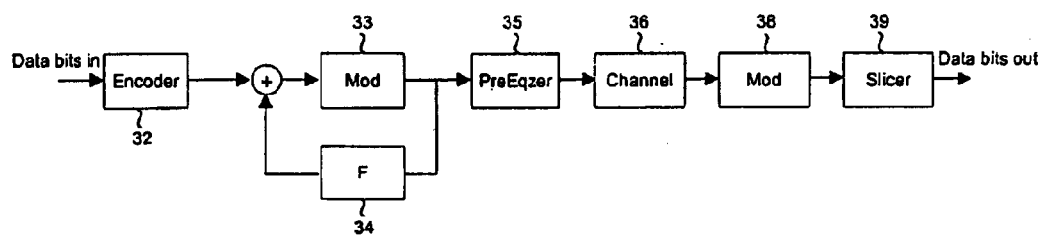
FIG. 9 shows an exemplary Tomlinson-Harashima preceding arrangement utilizing a pre-equalizer.

Since channel 36 is typically substantially linear, as shown in FIG. 9, the feedforward equalizer in FIG. 8, can be moved ahead of channel 36. However, in doing so, performance may be degraded if equalizer 37 is non-white as the channel 36 input power is generally limited by regulation. Thus it is generally preferable to make equalizer filter resemble an all-pass function, and have the precoder take care of the amplitude distortion of channel 36. A DFE arrangement tends to accomplish this, where the feedback section approximates a minimum-phase representation of channel 36, and the feedforward section equalizes the remaining channel 36 effects in a minimum-mean-square-error (MMSE) sense, becoming approximately white under normal conditions. In this scenario, the equalization is taken care of by the transmitter (e.g. client modem 23), and the remaining receiver functions are only gain-control, slicing (quantizing) and decoding of data-bits. The processing load has thus been greatly reduced.

In the embodiment described above, the transmitter is preferably locked to the clock on the receiver side, which in the case of line card 26 is typically a network clock. Then, using a fractionally spaced forward equalizer section, preferably no timing recovery is required in the receiver.

As suggested in the previous section, different strategies or methods are available in determining the precoder taps. Usually these strategies involve training an equalizer section in the receiver. However, in the case of resource limited receivers, there may not be sufficient resources to train up an entire equalizer. As used herein, resource limited, when referring to receivers, means the receiver does not have enough memory or computational capability to efficiently train up an entire equalizer of the size desired for equalizing the channel. In the following, two exemplary methods of incrementally constructing precoder taps are presented where the receiver can allocate minimal resources to that construction. In other words, two examples of how to generate precoder taps with a resource limited transceiver are presented.

I. Channel-estimate Based Precoder Filter Construction.

One method of obtaining equalizer taps, herein referred to as channel-estimate based precoder filter construction, is to first construct an estimate of the channel response and then calculate the equalizer taps from that estimate. Several strategies may be used in that calculation. For example, a minimum-phase response may be calculated from the channel response to provide a feedback section, and the feedforward section may then be derived as a Minimum-Mean-Square-Error solution to the remaining channel response, i.e., taking the channel noise into account. RLS-based methods can also be used.

In the resource-limited scenario, the less-limited transceiver can perform the equalizer calculation. In case of the line-card, the line-card typically generates the channel response, and the modem typically calculates the precoder and pre-equalizer taps. But generating the channel response can generally require significant resources. A common algorithm is similar to echo-canceling, given the transmitted sequence $u_n$ which is known in the receiver and the received sequence $y_n$, a set of channel response taps $\{h_k\}$ is generated by the following algorithm:

$$\hat{y}_n = \sum_{k=0}^{K-1} h_k^{(n)} x_{n-k} \quad (1)$$

$$e_n = y_n - \hat{y}_n$$

$$h_k^{(n-1)} = h_k^{(n)} + \beta e_n x_{n-k}, k = 0, 1, \ldots K-1$$

After iterating a few thousand times, an adequate channel estimate may be obtained. By suitably choosing the update rate $\beta$, and lowering it properly as the iteration proceeds, an accurate channel estimate is ordinarily provided.

While this calculation can be resource intensive, it is generally identical to the echo-cancelling often performed by Digital Signal Processors in line cards. Thus, by allowing a transmission segment where a signal is transmitted only in the direction of the modem to the line-card, the line-card echo canceller can be used to generate the channel estimate. This usually requires the modem to first acquire an accurate estimate of the line-card sampling clock and lock its transmitter to that timing while not receiving any signal from the line card. While this may typically be difficult for extended periods, it is a well-known technique. Alternately, the echo canceller may be used to partially cancel the echo from the line-card transmitter, and then partially apply it to generating the channel estimate.

The resource requirements may be further reduced by calculating only a section of the channel response at any given time. In other words, the step of constructing an estimate of the channel response may be performed only a section at a time. Thus, the line card may first estimate the channel response taps around the center of the response (i.e., where most of the channel response energy is located), i.e., determine integers $k_1$ and $k_2$ between 0 and K−1 and perform the following calculation:

$$\hat{y}_n^{(k_1,k_2)} = \sum_{k=k_1}^{k_2} h_k^{(n)} x_{n-k} \quad (2)$$

$$e_n = y_n - \hat{y}_n^{(k_1,k_2)}$$

$$h_k^{(n+1)} = h_k^{(n)} + \beta e_n x_{n-k}, k = k_1, k_1+1, \ldots, k_2$$

This will provide an unbiased estimate of $\{h_k\}$ in the range between $k_1$ and $k_2$. Once a suitable estimate has been obtained, other segments can be obtained by using the following algorithm:

$$\hat{y}_n^{(k_3,k_4)} = \sum_{k=k_1}^{k_2} h_k^{(n)} x_{n-k} + \sum_{k=k_3}^{k_4} h_k^{(n)} x_{n-k} \quad (3)$$

$$e_n = y_n - \hat{y}_n^{(k_3,k_4)}$$

$$h_k^{(n+1)} = h_k^{(n)} + \beta e_n x_{n-k}, k = k_3, k_3 + 1, \ldots, k_4$$

In this manner, the whole set of $\{h_k\}$ can be incrementally obtained, although not as quickly as if the whole set is determined simultaneously. If the resources are so limited that even the above algorithm is not achievable, different segments may be obtained by simply omitting the use of the segment between $k_1$ and $k_2$ in (3), effectively making the algorithm the same as (2). The least amount of calculation can be performed by shortening the segments to a size of 1. In other words, an estimate of the channel response is performed only one tap at a time. Thus:

$$\hat{y}_n^{(k_m,k_m)} = h_m^{(n)} x_{n-m} \quad (4)$$

$$e_n = y_n - \hat{y}_n^{(k_m,k_m)}$$

$$h_m^{(n+1)} = h_m^{(n)} + \beta e_n x_{n-m}$$

Although this algorithm will certainly converge to a correct estimate of $\{h_k\}$, it will exhibit extremely slow convergence.

This algorithm can also be used in data mode to further refine the estimate, using then the receiver's estimate of the transmitted signal rather than the predetermined sequence $u_n$. By continually transferring refinements of the channel estimate to the modem, the modem could refine the precoder and pre-equalizer taps to the point of almost ideal equalization and maximum data rate.

II. Iterative Equalizer -based Precoder Filter Construction.

An alternative method, referred to herein as iterative equalizer -based precoder filter construction, is based on generating the precoder and pre-equalizer filter from a shortened line-card equalizer. Assuming the line card can implement a small equalizer, such as a 8-tap feedfoward section with a 4-tap feedback section, it should be able to initiate the communication using that short equalizer at a low number of bits per symbol. In alternate embodiments, fewer or more taps could be used. The line card would preferably then at some point transfer the equalizer sections to the transmitter, which would preferably install the taps in its precoder section, after which the communication would preferably proceed as before. But then the receiver could start generating a new set of equalizer taps to improve on the equalization, preferably quite independent of the previously transferred taps, and at some point preferably transfer that second set. The transmitter would preferably incorporate the second set by convolving the feedforward section with the previous pre-equalizer, and adding the feedback section tap by tap to its precoder taps.

The receiver, after transferring its tap update to the transmitter, would preferably first zero out the feedforward and feedback sections, set one of the taps in the feedforward section to 1, and then resume training of the taps. Preferably it would alter the set of taps being used and updated, e.g., by adding a variable delay before the feedback section of the equalizer and a positive or negative delay in the feedforward section, separating out the tap initialized to 1.

The transmitter would preferably check the precoder taps to ensure stability of the precoder filter. In cases where the stability was in question, it could either discard the tap update or incorporate its effect into the pre-equalizer.

In this manner, the equalization can be improved as needed, indeed its minimal form may not require any transfer of taps at all. This may be the case for on-hook line-card transmission, where as little as 1 bit per symbol may be a sufficient data rate and a short equalization arrangement may suffice. Being part of a more general method allows it not only to extend to higher on-hook transmission rates, but also to V.90 type transmission and beyond.

Figure 11:
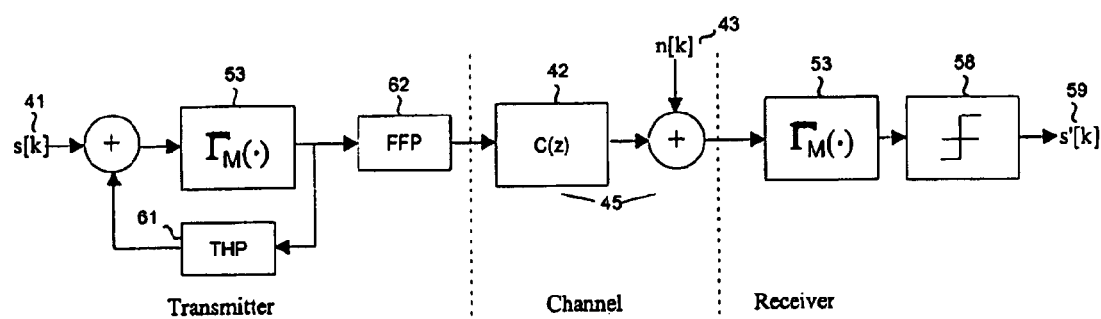
FIG. 11 illustrates, as an example, the transmission mode of method A of determining the taps for the Tomlinson-Harashima precoder (THP) and the prefilter (FFP)

There are many ways to determine the taps for the Tomlinson-Harashima precoder (THP, e.g. THP 61 shown in FIG. 11 and the FFP (e.g. prefilter 62). Four possible methods will be outlined here as examples, with reference to the figures.

A. Send a known m-sequence from Customer Premises Modem (CPM) (e.g. client modem 23 shown in FIG. 2) to LCM (line card 26 shown in FIG. 2), which allows the receiver to make a channel estimate, based on which THP 61 and prefilter 62 taps can be found.

B. Begin with conventional equalizer training at the receiver, then send the resulting taps to the transmitter.

C. Same as B, except that initially there is a very small equalizer, the resulting taps are sent to the CPM, then, using THP 61 and prefilter 62, another small equalizer is trained, in turn that equalizer is incorporated into THP 61 and prefilter 62. This method is iterated until there is a sufficiently good THP 61 and prefilter 62.

D. Send a known pseudo-random sequence from CPM to LCM (line card 26 shown in FIG. 2) and find the correlation between the transmitted signal and the received signal for a specific delay. Thus one, or a few, channel tap(s) can be updated at a time.

Figure 10:
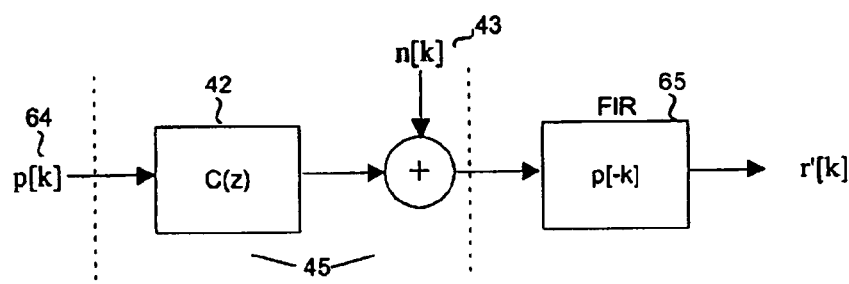
FIG. 10 illustrates, as an example, the training mode of method A of determining the taps for the Tomlinson-Harashima precoder (THP) and the prefilter (FFP)

Method A is described in reference to FIGS. 3 and 8. FIG. 10 illustrates the training mode of method A. First an m-sequence (64 in FIG. 10) p[k] of period K is transmitted such that transmitted discrete signal 41:

$$s[k]=p[k] \quad (4)$$

The received (discrete) signal 44 is r[k]=p'[k], such that $$p'[k] = \sum_{l=0}^{N-1} c[l]p[k-l] + n[k] \quad (5)$$

Using the property of the m-sequence that its autocorrelation approximates an impulse sequence, p'[k] is put through a FIR filter 65 with taps corresponding to the time reversal of one period of the m-sequence, resulting in the output r'[k]

$$r'[k] = \sum_{l=0}^{K-1} p[l-k]p'[l] \quad (6)$$

Repeating this process over sufficiently many periods and taking an average the channel estimate is determined $$c'[k] = \frac{1}{M}\sum_{i=1}^{M} r'_i[k] \qquad (7)$$

such that c'[k]≡c[k], for k=0. . . N−1 and N=the number of channel taps.

Having estimated the channel (e.g. channel 45), the LCM (line card 26 shown in FIG. 2) sends information about the channel taps to the CPM (client modem 23 shown in FIG. 2) using some kind of start-up modulation. Thus, the line card is preferably programmed to help select the precoder taps. There exist known methods to convert the information contained in the channel taps into equalizer taps. The end result, then, is the transmission mode shown in FIG. 11.

Using this method, the LCM (line card 26 shown in FIG. 2) only has to do some additions and subtractions. More specifically, if K is the period length and M is the number of iterations, this involves M(K−1) summations to find r'[k] and M−1 summations to find c'[k] making a total of MK−1 summations. A typical value of K would generally be in the range of 31 to 255, satisfying the condition K=$2_i$−1, where i is an integer (note the condition that K>N). M could be around 10, and the number of channel taps, N, will probably be upwards of 100, so the total arithmetic operations needed to find the channel taps are on the order of $10^5$. Of course the LCM (line card 26 shown in FIG. 2) then has to expend some processing power to send those taps to the CPM (client modem 23 shown in FIG. 2), but it is primarily the peak processing load that is of concern.

Figure 12:
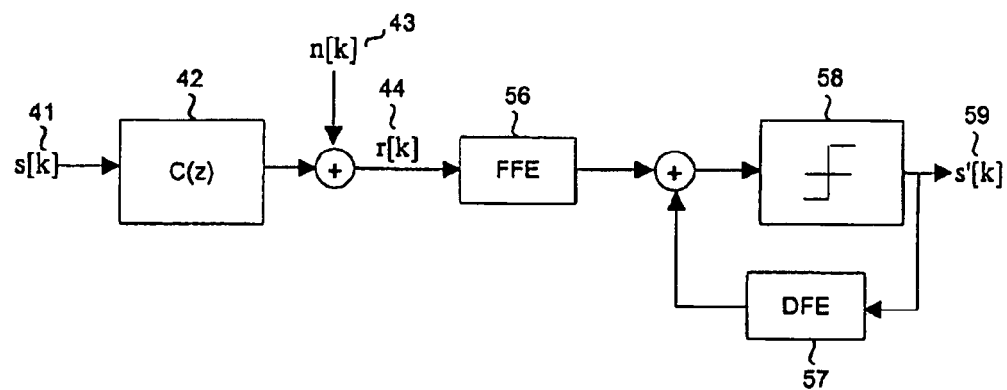
FIG. 12 illustrates, as an example, the training mode using method B of determining the taps for the Tomlinson-Harashima precoder (THP) and the prefilter (FFP)

FIG. 12 illustrates the training mode using method B of determining the taps for THP 61 and the prefilter 62. Method B, is to train the equalizer completely on the LCM (line card 26 shown in FIG. 2) and then transfer the taps to the CPM (client modem 23 shown in FIG. 2). In other words, the line card has a line card equalizer with line card taps, and the line card trains the line card taps. Then the precoder taps are selected by the line card sending the line card taps to the customer premises modem, and the customer premises modem incorporating the line card taps in the precoder taps. These steps are preferably then repeated through multiple iterations.

Referring to FIG. 12, some known sequence s[k] (transmitted discrete signal 41) is transmitted, and r[k] (received discrete signal 44) is received $$r[k] = \sum_{l=0}^{N-1} c[l]s[k-l] + n[k] \qquad (8)$$

This is put through the FFE (feedforward equalizer 56)

$$q[k] = \sum_{l=0}^{L-1} f[l]r[k-l] \qquad (9)$$

and then through decision feedback equalizer (DFE) 57, the slicer being represented by a decision function u(·), resulting in s'[k] (59) being $$s'[k] = u\left(q[k] - \sum_{l=0}^{P-1} d[l]s'[k-1-l]\right) \qquad (10)$$

The training error is $$e[k]=s[k]-\zeta[k] \qquad (11)$$

where ζ[k] is the input to the slicer $$\zeta[k] = q[k] - \sum_{l=0}^{P-1} d[l]s'[k-1-l] \qquad (12)$$

Using the error and some sort of adaptive training algorithm (LMS for example) the equalizer taps (f[k] and d[k]), can be determined. Then, those taps are typically sent back to the transmitter (client modem 23 shown in FIG. 2) and used for the THP 61 and the prefilter 62, resulting, as before, in the transmission mode in FIG. 11. Thus, the line card is preferably programmed to help select the precoder taps.

It is apparent that this method leaves a lot of computation to the LCM (line card 26 shown in FIG. 2). Using LMS to equalize a decent channel with 100 filter taps would typically require on the order of $10^5$ arithmetic operations to train the equalizer, and preferably more. The peak processing load will generally be higher than that of method A.

Figure 13:
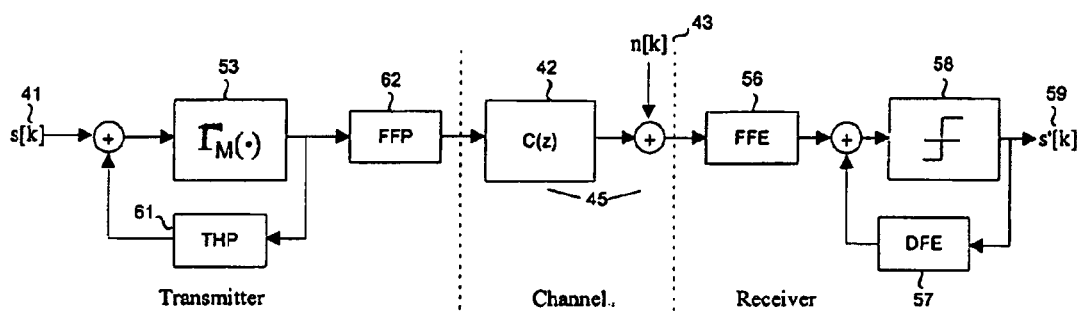
FIG. 13 illustrates, as an example, the training mode of method C of determining the taps for the Tomlinson-Harashima precoder (THP) and the prefilter (FFP)

FIG. 13 illustrates the training mode of method C of determining the taps for the Tomlinson-Harashima precoder (THP) 61 and the prefilter 62. This method is similar to the previous one. Method C begins in the same way, by training an equalizer in the LCM (line card 26 shown in FIG. 2), however, in this case the number of taps, Q+R, is significantly less than L+P, the equalizer lengths in method B, where L is the length of the FFE, P is the length of DFE, Q is the length of the small FFE, and R is the length of the small DFE. Having trained this small equalizer, the taps are sent to the CPM (client modem 23 shown in FIG. 2), preferably to be used for THP 61 and prefilter 62. Now, still in training mode and using the short THP 61 and prefilter 62, another short equalizer is preferably trained in the LCM (line card 26), possibly, but not necessarily, of the same lengths Q+R. These taps are then preferably sent back to the CPM (client modem 23 shown in FIG. 2) and incorporated into THP 61 and the prefilter 62. Thus, the line card taps are fewer in number than the precoder taps, and the line card is preferably programmed to help select the precoder taps part at a time. In other words, the customer premises modem preferably incorporates the line card taps into the precoder taps, part of the precoder taps at a time. It could also be said that the taps in the customer premises modem are updated part at a time. In this way, the training procedure is iterated at least until THP 61 and prefilter 62 are sufficiently good.

Strictly speaking, all the equalizer training is still done in the LCM (line card 26 shown in FIG. 2), but the number of arithmetic operations per time unit, required of the LCM (line card 26 shown in FIG. 2) is significantly less, and the CPM (client modem 23 shown in FIG. 2) does in fact take a large part in the training procedure by pre-equalizing the channel with the increasingly long filters. Although the total number of arithmetic operations of the training procedure is more than in method B, the number of arithmetic operations performed by the LCM (line card 26 shown in FIG. 2) is lower. The total time required for the training procedure will also probably be more than in method B, but the LCM (line card 26 shown in FIG. 2) will be much less strained. Most importantly, the peak processing load is less than that of method B. However, as described, the line card is preferably programmed to help select the precoder taps.

It is even harder to quantify the LCM (line card 26 shown in FIG. 2) processing required by this method than method B. but if the same assumptions are made as there, and it is assumed that Q=R=5, then the number of arithmetic operations, required of the LCM (line card 26 shown in FIG. 2), is roughly a tenth of that required by method B. The training mode of method C can be seen in FIG. 11, and the transmission mode, as before, is shown in FIG. 9.

The fourth implementation mentioned here, Method D, is to gradually determine the channel taps, one at a time, spreading the required processing for the LCM (line card 26 shown in FIG. 2) over time. This could be done by using a known pseudo-random sequence p[k]. This would work similarly to method A, except that instead of estimating the whole channel 45 all at once, the average is taken over M values of k of the correlation between p[k−m] and p'[k]. Then the value of m is changed and the average is taken over the next M values of k. Example:

1. find c'[$m_1$]: m=$m_1$, k=O . . . M−1
2. find c'[$m_2$]: m=$m_2$, k=M . . . 2M−1
3. etc.

In short, the channel estimate for a certain delay is produced, and then the channel estimate for another delay is produced, etc. Thus, the precoder taps are selected by sending a transmitted signal comprising a pseudo-random sequence from the customer premises modem to the line card. The line card receives a received signal, and the correlation between the transmitted signal and the received signal is preferably found for a specific delay.

Starting by transmitting transmitted discrete signal 41

$$s[k]=p[k] \quad (13)$$

Then receiving r[k]=p'[k] where r[k] is the received discrete signal 44

$$p'[k] = \sum_{l=0}^{L-1} c[l]p[k-l] + n[k] \quad (14)$$

Then, repeating this procedure M times, an estimate is produced of one channel tap $$c'[m_1] = \frac{1}{M}\sum_{l=0}^{M-1} p'[l]p[l-m_1] \quad (15)$$

This channel tap estimate is sent to the CPM (client modem 23 shown in FIG. 2), where the information is used to appropriately update the filters. The line card sends the channel tap estimate. Thus, the line card is preferably programmed to help select the precoder taps. Then another channel tap is updated:

$$c'[m_2] = \frac{1}{M}\sum_{l=M}^{2M-1} p'[l]p[l-m_2] \quad (16)$$

and so on.

By employing this method, the number of arithmetic operations per channel tap is generally comparable to that in method A. The training time is usually longer, but most importantly, the peak processor load is ordinarily lower. Note, that it is possible to use this method to determine a number of taps at a time, thereby allowing a trade-off between the load on the LCM (line card 26 shown in FIG. 2) processor, and the length of the training time. Thus, the precoder taps are preferably selected or updated part, or one, at a time. In addition, the steps of updating the taps are preferably repeated through multiple iterations.

Figure 14:
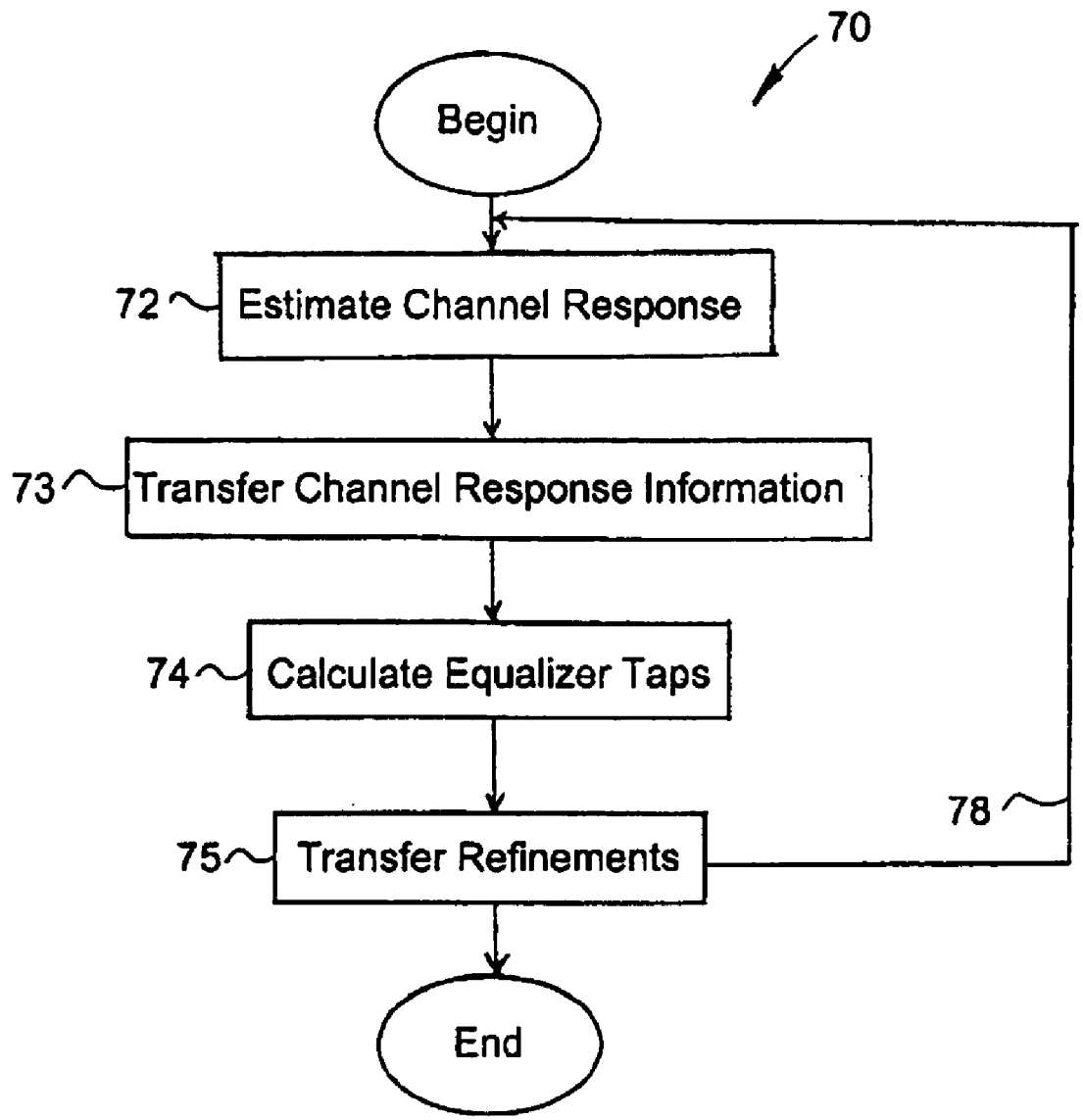
FIGS. 14 through 17 illustrate through flow charts several embodiments of the present invention.

FIG. 14 illustrates an exemplary method of generating precoder taps with a resource-limited transceiver, method 70. Step 72 is the step of constructing an estimate of the channel response. In some embodiments, a line card generates the channel response, and a customer modem calculates precoder and pre-equalizer taps. In one such embodiment, the line card has an echo cancellor, and the echo cancellor performs step 72. Step 72 may be performed only a section at a time, or even only one tap at a time. For some embodiments, the next step is step 73, transferring the channel response information. Other embodiments do not have step 73, as an example, where no transfer is necessary. The next step illustrated in FIG. 14 is step 74, calculating the equalizer taps. The equalizer taps are usually calculated from the estimate, and the less-limited transceiver typically performs the equalizer calculation. In one exemplary embodiment, step 74 includes calculating a minimum-phase response to provide a feedback section. In another exemplary embodiment, step 74 includes calculating a minimum-mean-square-error solution to derive a feedforward section. Some embodiments also have step 75 wherein the line card continually transfers refinements of the channel estimate to the customer modem through loop 78. Additional detail regarding the method illustrated in FIG. 14 is provided above.

Figure 15:
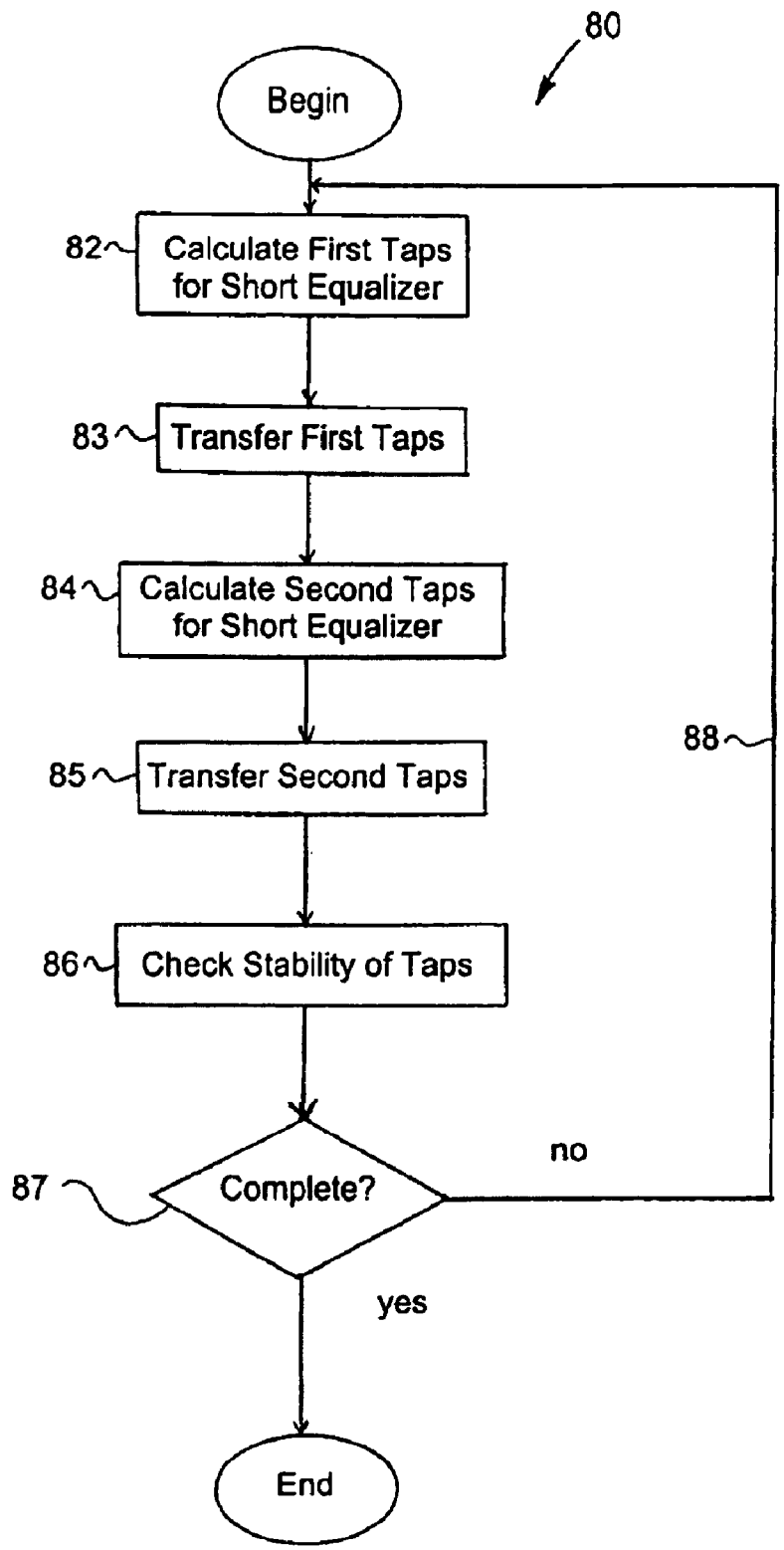

FIG. 15 illustrates another exemplary method of generating precoder taps with a resource-limited transceiver, method 80. Step 82 is typically performed with the resource-limited transceiver, and includes calculating a first set of equalizer taps for a shortened equalizer. The next step, step 83, is the step of transferring the first set of equalizer taps to the less-limited transceiver, Also in step 83, the less-limited transceiver installs the equalizer taps in its precoder section. In one exemplary embodiment, the resource-limited transceiver is a line card, and the less-limited transceiver is a customer modem. In one exemplary embodiment, the shortened equalizer has a feedforward section and a feedback section. In one embodiment, the feedforward section has eight taps, and the feedback section has four taps. However, in alternate embodiments, fewer or more taps may be used. The next step, step 84 is typically performed with the resource-limited transceiver, and includes calculating a second set of equalizer taps for the shortened equalizer. In one exemplary embodiment, the second set of equalizer taps is independent of the first set of equalizer taps. The next step, step 85, is the step of transferring the second set of equalizer taps to the less-limited transceiver. Also in step 85, the less-limited transceiver installs the equalizer taps in its precoder section. In one exemplary embodiment, the less-limited transceiver installs the equalizer taps in step 85 by convolving the feedforward section with the previous pre-equalizer, and adding the feedback section tap by tap to the precoder taps. Some embodiments also include step 86, which is the step of the less-resource limited transceiver checking the precoder taps to ensure stability of the precoder filter. However, other embodiments do not have step 86. In step 87, these steps are repeated through loop 88. In other words, as described elsewhere herein, the resource-limited transceiver repeatedly calculates taps for the shortened equalizer and transfers the taps to the less-limited transceiver. In some embodiments, the steps are repeated until the transmission is complete. Additional detail regarding the method illustrated in FIG. 15 is provided elsewhere herein.

Figure 16:
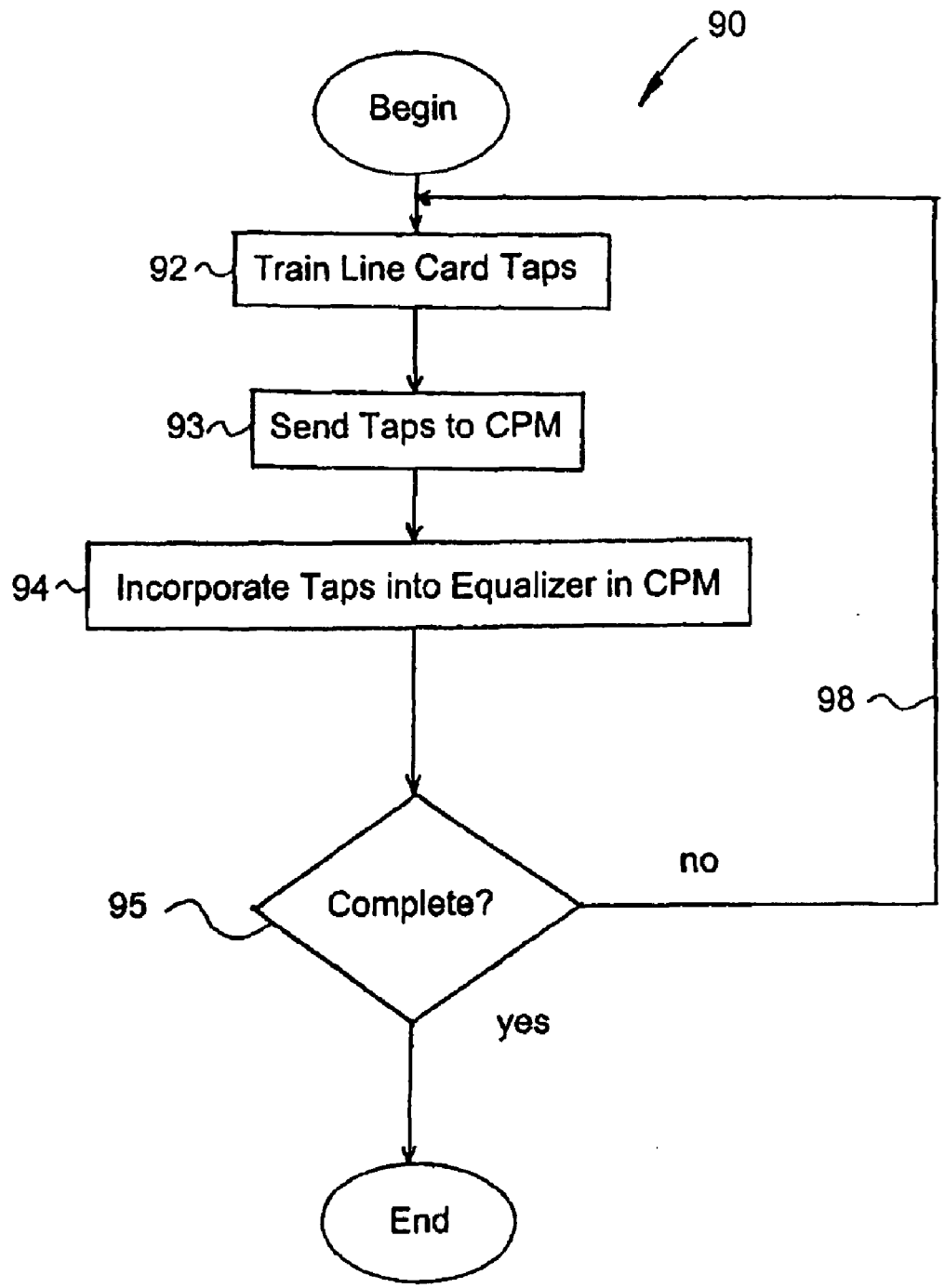

FIG. 16 illustrates an exemplary method for asymmetric processor load sharing between a customer premises modem and a central office line card, method 90. Method 90 includes step 92, which involves training an equalizer in the line card. The equalizer has taps, and the next step, step 93, is to send the first taps to the customer premises modem. The customer premises modem has a second equalizer with its own taps (second taps). In some embodiments, the second equalizer has a prefilter. In addition, in some embodiments, the second equalizer is a Tomlinson-Harashima precoder. Furthermore, in some embodiments, the second equalizer has both a Tomlinson-Harashima precoder and a prefilter. The next step, step 94, is to incorporate the first taps into the second taps of the second equalizer. The next step, step 95 is to repeat the above steps (steps 92 through 94) through multiple iterations through loop 98. In other words, as described elsewhere herein, the line card repeatedly trains taps for its equalizer and transfers the taps to the customer premises modem which repeatedly incorporates them into its own equalizer. In some embodiments, the steps are repeated until the transmission is complete. In some embodiments, the first taps are significantly fewer in number than the second taps and the second taps are updated part at a time. Additional detail regarding the method illustrated in FIG. 16 is provided above with reference to other figures.

Figure 17:
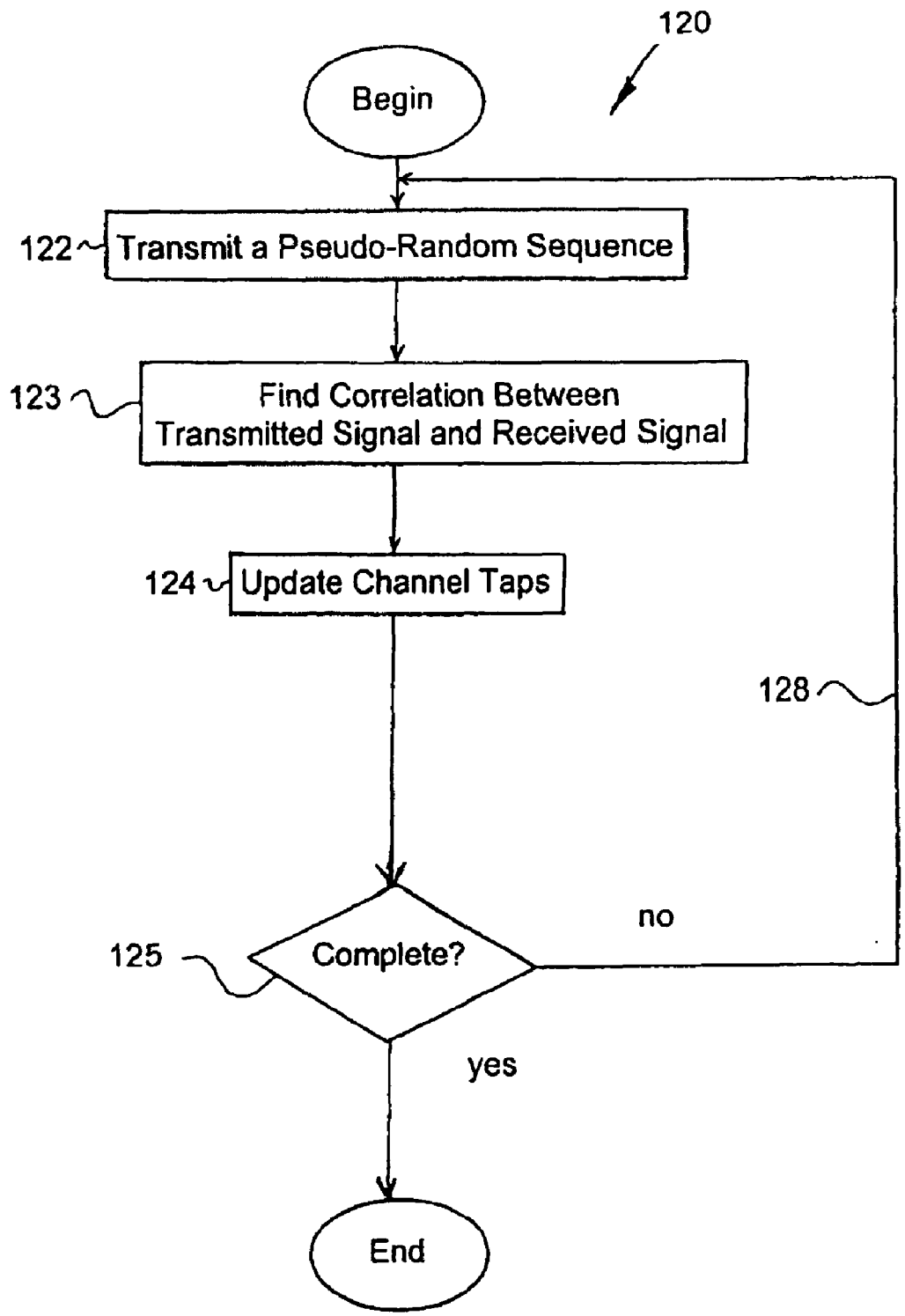

FIG. 17 illustrates another exemplary method for asymmetric processor load sharing between a customer premises modem and a central office line card, method 120. Method 120 includes step 122, the step of transmitting a known pseudo-random sequence. In method 120, the sequence is transmitted from the customer premises modem to the line card. The next step, step 123, is to find the correlation between the transmitted signal and the received signal. This is generally done for a specific delay. The next step, step 124 is to update part of the channel taps. The part of the channel taps is usually several taps; however, in some embodiments, the part of the channel taps is one tap. The next step, step 125, is to repeat the above steps through multiple iterations through loop 128. In some embodiments, the steps are repeated until the transmission is complete. In some embodiments, the processing required of the line card is spread out over time. This reduces the load on the line card as described elsewhere herein.

The present invention has been described above with reference to exemplary embodiments. However, those skilled in the art will recognize that changes and modifications may be made to exemplary embodiments without departing from the scope of the present invention. For example, the various adaptive algorithm expressions may be implemented in alternate ways depending upon the particular application or in consideration of any number of cost functions associated with the operation of the system. In addition, the techniques described herein may be extended or modified for use with other adaptively trainable components in a digital data communication system. These and other changes or modifications are intended to be included within the scope of the present invention, as expressed in the following claims.

What is claimed is:

1. A digital data communications system comprising:
  a. a first transceiver having an equalizer with a plurality of taps, said first transceiver configured to equalize voice-band analog signals in each of receive and transmit directions;
  b. a second transceiver;
  c. a local loop connecting said first transceiver to said second transceiver; and
  d. a feedback means for said second transceiver to calculate tap correction factors for said plurality of taps repeatedly during a transmission of digital data, and transfer said tap correction factors to said first transceiver;
  wherein said first transceiver performs substantially more processing than said second transceiver for equalizing said voice-band analog signals in each of receive and transmit directions;
  wherein said second transceiver generates said tap correction factors, squares each tap correction factor to generate a squared tap correction factor, adds said squared tap correction factor to generate a sum, and transfers said tap correction factors to said first transceiver if said sum exceeds a pre-determined threshold.

2. The system according to claim 1 wherein said second transceiver comprises a line card and and a digital signal processor (DSP).

3. The system according to claim 1 wherein said first transceiver comprises a voice-band modem.

4. The system according to claim 1 wherein said first transceiver comprises a Tomlinson precoder.

5. The system according to claim 1 wherein said first transceiver comprises a near-flat pre-equalizer.

6. The system according to claim 1 further comprising a means for enabling said feedback means only when said tap correction factors have changed.

7. The system of claim 1, wherein the first transceiver uses the equalizer to equalize the voice-band analog signals, and wherein the equalizer has a feedforward section and a feedback section, and the feedforward section has no more than eight taps, and the feedback section has no more than four taps.

8. The system of claim 1, wherein the first transceiver uses the equalize the voice-band analog signals, and wherein the equalizer has a feedforward section and a feedback section, and the feedforward section has at least eight taps, and the feedback section has at least four taps.

9. A digital data communications system comprising:
  a. a transmitter configured to receive a digital signal, convert the digital signal to a voice-band analog signal, and transmit the voice-band analog signal via a communication medium to a receiver;
  b. said transmitter further comprising an equalizer having a plurality of taps wherein said equalizer is configured to equalize the voice-band analog signal; and
  c. said transmitter further being configured to repeatedly receive, from said receiver, tap correction factors, during transmission of said voice-band analog signal, and incorporate said tap correction factors in said taps;
  wherein said transmitter performs substantially more processing than said receiver for equalizing said voice-band analog signal;
  wherein said receiver generates said tap correction factors, squares each tap correction factor to generate a squared tap correction factor, adds said squared tap correction factors to generate a sum, and transfers said tap correction factors to said transmitter if said sum exceeds a pre-determined threshold.

10. The system according to claim 9 wherein said receiver comprises a line-card.

11. The system according to claim 9 wherein said transmitter further comprises a Tomlinson precoder, and said taps are incorporated in said Tomlinson precoder.

12. The system according to claim 11 wherein said transmitter further comprises a near-flat pre-equalizer following said Tomlinson precoder.

13. The system according to claim 9 wherein said receiver is configured to calculate a limited number of said tap correction factors at a time and transfer said limited number of said tap correction factors to said transmitter.

14. The system according to claim 9 wherein said receiver comprises a digit signal processor (DSP).

15. The system according to claim 9 wherein said transmitter comprises a feedforward equalizer and a decision feedback equalizer.

16. The system according to claim 9 wherein the receiver is configured to transfer said tap correction factors when said tap correction factors have changed significantly.

17. The system of claim 9, wherein the transmitter includes the equalizer having a feedforward section and a feedback section, and wherein the feedforward section has no more than eight taps, and the feedback section has no more than four taps.

18. The system of claim 9, wherein the transmitter includes the equalizer having a feedforward section and a feedback section, and wherein the feedforward section has at least eight taps, and the feedback section has at least four taps.

19. A method of generating precoder taps with a resource-limited transceiver comprising the steps of:
 a. with the resource-limited transceiver, calculating a first set of equalizer taps for a shortened equalizer, the shortened equalizer having a feedforward section and a feedback section,
 b. transferring the first set of equalizer taps to a less-limited transceiver, the less-limited transceiver installing the equalizer taps in a precoder section of the less-limited transceiver;
 c. with the resource-limited transceiver, calculating a second set of equalizer taps for the shortened equalizer;
 d. transferring the second set of equalizer taps to the less-limited transceiver, the less-limited transceiver installing the equalizer taps in its precoder section; and
 e. repeating these steps a, b, c and d;
 wherein, for each of said first and second set of equalizer taps, said resource-limited transceiver calcaulates said equalizer taps, squares each equalizer tap to generate a squared equalizer tap, adds said squared equalizer taps to generate a sum, and transfers said equalizer taps to said less-limited transceiver if said sum exceeds a pre-determined threshold.

20. The method of claim 19, the second set of equalizer taps being independent of the first set of equalizer taps.

21. The method of claim 19, the resource-limited transceiver being a line card, and the less-limited transceiver being a customer modem.

22. The method of claim 19, said installing the second set of equalizer taps in step d) comprising convolving the feedforward section with the previous equalizer taps, and adding the feedback section tap by tap to the precoder taps.

23. The method of claim 19, further comprising the step of the less-limited transceiver checking the precoder taps to ensure stability of the precoder section.

24. A communication method for use by a modem in communication with a line card having a digital signal process (DSP) via a voice-band communication medium, said communication method comprising:

receiving a digital signal;

converting said digital signal into an analog signal;

pre-coding said analog signal using a pre-coder having pre-coder taps to generate a first output signal;

pre-equalizing said pre-coded analog signal using a pre-equalizer having pre-equalizer taps to generate a second output signal;

transmitting said second output signal to said line card via said voice-band communication medium;

receiving tap correction factors from said line card, wherein said tap correction factors are obtained by said DSP of said line card by analyzing said second output signal;

incorporating said tap correction factors into said pre-coder taps and said pre-equalizer taps;

repeating said receiving said digital signal, said converting, said pre-coding, said pre-equalizing, said transmitting, said receiving said tap correction factors and said incorporating;

wherein said modem performs substantially more processing than said line card for equalizing said voice-band analog signals in each of receive and transmit directions;

wherein said DSP of said line card generates said tap correction factors, squares each tap correction factor to generate a squared tap correction factor, adds said squared tap correction factors to generates a sum, and transmits said tap correcton factors to said modem if said sum exceeds a pre-determined threshold.

25. A method of generating precoder taps with a resource-limited transceiver comprising the steps of:
 a. with the resource-limited transceiver, calculating a first set of equalizer taps for a shortened equalizer, the shortened equalizer having a feedforward section and a feedback section,
 b. transferring the first set of equalizer taps to a less-limited transceiver, the less-limited transceiver installing the first set of equalizer taps in a precoder section of the less-limited transceiver;
 c. with the resource-limited transceiver, calculating a second set of equalizer taps for the shortened equalizer;
 d. transferring the second set of equalizer taps to the less-limited transceiver, the less-limited transceiver installing the second set of equalizer taps in the precoder section; and
 e. repeating the steps a, b, c and d;
 wherein, for each of said first and second set of equalizer taps, said resource-limited transceiver calculates said equalizer taps, squares each equalizer tap to generate a squared equalizer tap, adds said squared equalizer taps to generate a sum, and transfers said equalizer taps to said less-limited transceiver if said sum exceeds a pre-determined threshold.

26. The method of claim 25, the second set of equalizer taps being independent of the first set of equalizer taps.

27. The method of claim 25, the resource-limited transceiver being a line card, and the less-limited transceiver being a customer modem.

28. The method of claim 25 said installing the section set of equalizer taps in step d) comprising convolving the feedforward section with the previous equalizer taps, and adding the feedback section tap by tap to the precoder taps.

29. The method of claim 25 further comprising the step of the less-resource limited transceiver checking the precoder taps to ensure stability of the precoder section.

* * * * *